(12) United States Patent
Gregg et al.

(10) Patent No.: US 7,981,349 B2
(45) Date of Patent: *Jul. 19, 2011

(54) PRODUCTION OF UHMWPE SHEET MATERIALS

(75) Inventors: Joseph V. Gregg, Ft. Wayne, IN (US); Wesley Allen Kohler, Ossian, IN (US)

(73) Assignee: Quadrant EPP AG, Lenzburg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/813,548

(22) Filed: Jun. 11, 2010

(65) Prior Publication Data

US 2010/0244321 A1 Sep. 30, 2010

Related U.S. Application Data

(62) Division of application No. 11/491,416, filed on Jul. 21, 2006, now Pat. No. 7,758,796.

(51) Int. Cl.
*B29C 47/16* (2006.01)
(52) U.S. Cl. ...................................................... 264/323
(58) Field of Classification Search ................ 264/323
See application file for complete search history.

(56) References Cited

U.S. PATENT DOCUMENTS

| | | | |
|---|---|---|---|
| 1,902,953 A | 3/1933 | Hazell |
| 2,965,589 A | 12/1960 | Price |
| 3,382,535 A | 5/1968 | Ferrari |
| 3,384,925 A | 5/1968 | Rothemeyer |
| 3,492,310 A | 1/1970 | Carrow |
| 3,665,068 A | 5/1972 | Duling et al. |
| 3,695,575 A | 10/1972 | Hauser |
| 3,710,988 A | 1/1973 | Moslo |
| 3,804,567 A | 4/1974 | Recknagel |
| 3,883,631 A | 5/1975 | Murray |
| 3,887,319 A | 6/1975 | Cottingham |
| 4,008,035 A | 2/1977 | Korostoff et al. |
| 4,021,521 A | 5/1977 | Scholl et al. |
| 4,145,175 A | 3/1979 | Groff et al. |
| 4,182,606 A | 1/1980 | Gibbon |
| 4,238,538 A | 12/1980 | Manwiller |
| 4,240,997 A | 12/1980 | Jex |
| 4,368,022 A | 1/1983 | Orii |
| 4,781,554 A | 11/1988 | Hendry |
| 4,797,245 A | 1/1989 | Sonoda |

(Continued)

FOREIGN PATENT DOCUMENTS

DE 4418527 A1 6/1995

(Continued)

OTHER PUBLICATIONS

Tarkow et al., Surface Densification of Wood, Forest Products Journal, 18(a): 104-107, vol. 18, No. 9, Sep. 1968.

(Continued)

*Primary Examiner* — Joseph S Del Sole
*Assistant Examiner* — Kimberly A Stewart
(74) *Attorney, Agent, or Firm* — Brooks Kushman P.C.

(57) ABSTRACT

UHMWPE panels of large width may be ram extruded from a slit die in a stable process, by restraining a panel which exits the die below the crystalline melt temperature against movement away from the die by a back pressure device, so as to exert a back pressure between the back pressure device and the die, the back pressure device preferably constructed of a plurality of differentially adjustable elements so as to be able to compensate for changes in processing characteristics over time. Vertically restraining UHMWPE panels as they further cool also greatly improves product characteristics.

5 Claims, 3 Drawing Sheets

U.S. PATENT DOCUMENTS

| | | | |
|---|---|---|---|
| 4,842,507 A | 6/1989 | Kawaguchi et al. |
| 4,846,614 A | 7/1989 | Steinbock |
| 4,874,657 A | 10/1989 | Lo et al. |
| 4,904,318 A | 2/1990 | Goto et al. |
| 4,933,393 A | 6/1990 | Toyota et al. |
| 4,938,908 A | 7/1990 | Shiraki et al. |
| 4,948,543 A | 8/1990 | Pawlowski et al. |
| 4,952,625 A | 8/1990 | Shiohara et al. |
| 5,068,073 A | 11/1991 | Pennings et al. |
| 5,083,889 A | 1/1992 | Steinbock |
| 5,089,200 A | 2/1992 | Chapman, Jr. et al. |
| 5,149,193 A | 9/1992 | Faillace |
| 5,156,790 A | 10/1992 | Cucchisi et al. |
| 5,234,652 A | 8/1993 | Woodhams et al. |
| 5,286,576 A | 2/1994 | Srail et al. |
| 5,399,308 A | 3/1995 | Woodhams et al. |
| 5,417,561 A | 5/1995 | Shiraki et al. |
| 5,422,061 A | 6/1995 | Takahashi et al. |
| 5,449,484 A | 9/1995 | Gusik et al. |
| 5,474,722 A | 12/1995 | Woodhams |
| 5,567,368 A | 10/1996 | Ando et al. |
| 5,874,034 A | 2/1999 | Proper et al. |
| 5,946,878 A | 9/1999 | Grund et al. |
| 6,013,217 A | 1/2000 | Hauenstein et al. |
| 6,103,305 A | 8/2000 | Friedmann et al. |
| 6,112,396 A | 9/2000 | Steinbock |
| 6,113,374 A | 9/2000 | Brackman et al. |
| 6,199,453 B1 | 3/2001 | Steinbock |
| 6,263,764 B1 | 7/2001 | Steinbock |
| 6,381,827 B1 | 5/2002 | Steinbock |
| 6,489,404 B2 | 12/2002 | Bolluijit et al. |
| 6,652,254 B2 | 11/2003 | Shimura et al. |
| 6,949,208 B1 | 9/2005 | Kawauchi et al. |
| 2004/0265407 A1 | 12/2004 | Prugh et al. |
| 2006/0079596 A1 | 4/2006 | Schroeder et al. |
| 2006/0258767 A1 | 11/2006 | Schroeder et al. |

FOREIGN PATENT DOCUMENTS

| | | |
|---|---|---|
| GB | 1479335 | 7/1977 |
| JP | 60101021 | 6/1985 |
| JP | 8224711 A | 9/1996 |
| WO | 2006041969 A1 | 4/2006 |
| WO | 2008009149 A1 | 1/2008 |
| WO | 2008009150 A1 | 1/2008 |

OTHER PUBLICATIONS

Earl E. Day, "Continuous Extrusion of Recovered Ultra-High Molecular Weight Polyethylene," Chelsea Center for Recycling and Economic Development Technical Research Program, Jan. 2000, Technical Report #16, pp. 1-3, Jan. 2000.

ArCom Processed Polyethylene, "Resin and Consolidation Issues with UHMWPE". Biomet Inc., Form No. Y-BEM-069/093095/H, 1995.

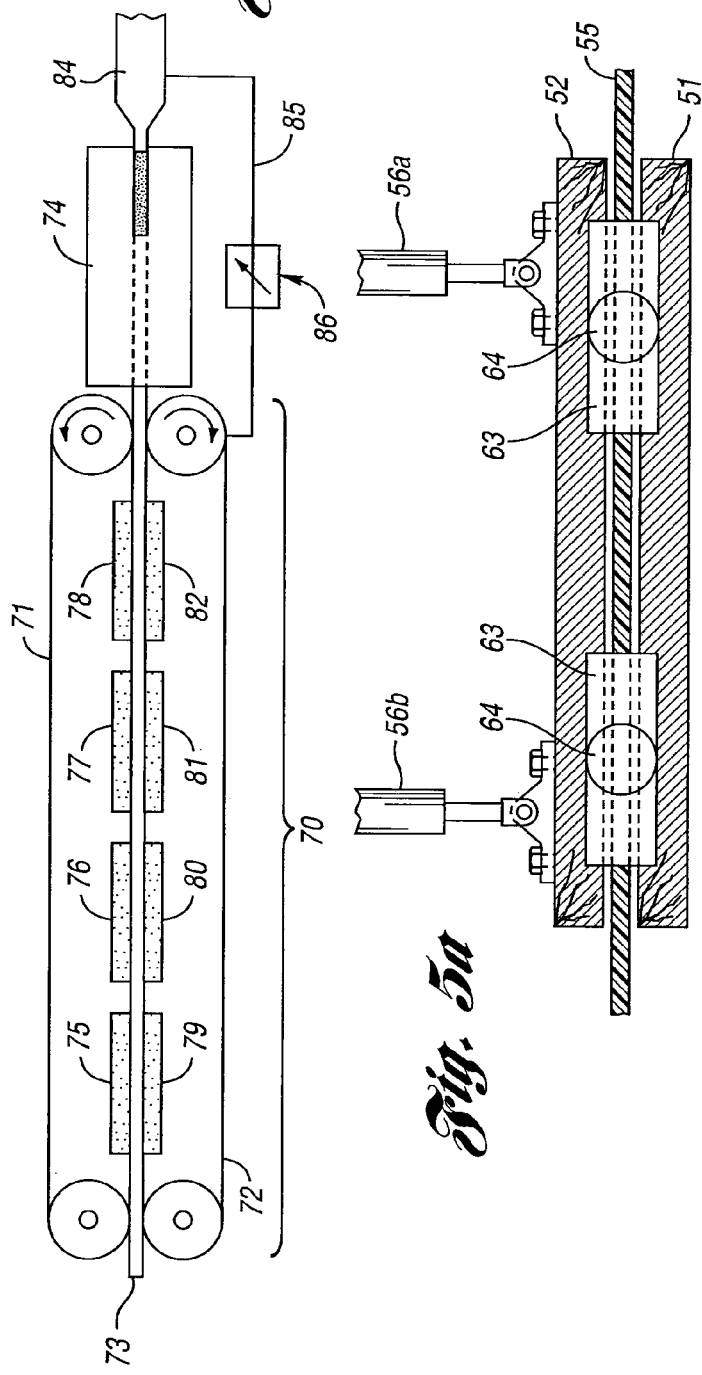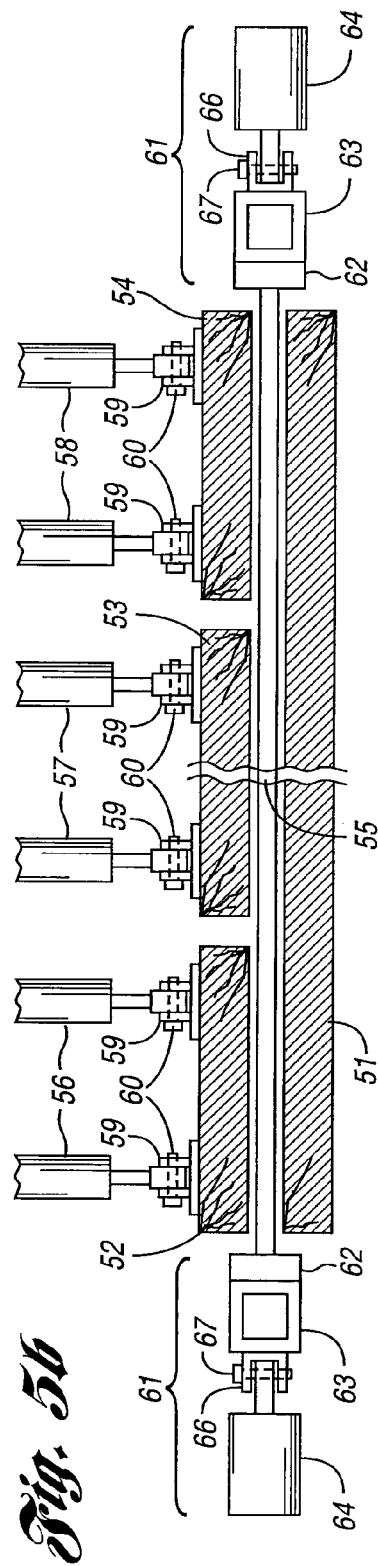

PRODUCTION OF UHMWPE SHEET MATERIALS

CROSS-REFERENCE TO RELATED APPLICATIONS

This is a divisional application of copending U.S. application Ser. No. 11/491,416 filed Jul. 21, 2006. The disclosure of which is incorporated in its entirety by reference herein.

BACKGROUND OF THE INVENTION

1. Field of the Invention

The present invention is directed to the production of sheets of ultra high molecular weight polyethylene in widths preferably greater than about 40 cm, by ram extrusion.

2. Background Art

Conventional polyethylene polymers with which many are familiar, i.e. low and high density polyethylene, are waxy solids not known for exceptional strength properties. Also, due to their relative softness, while generally lubricious, they are easily abraded. Ultra high molecular weight polyethylene, "UHMWPE", on the other hand, is an exceptionally strong and durable polymer totally unlike its poorer relatives.

UHMWPE is prepared by special polymerization processes in which the polyethylene chains acquire an exceptionally high molecular weight, typically having number average molecular weights of from $1.5 \times 10^6$ to $1 \times 10^7$ daltons, supplied as a resin powder. UHMWPE also includes those polymers defined in ASTM D4020-05; D6712-01; and ISO 11542-2. While generally homopolymeric in nature, UHMWPE also includes copolymers having limited amounts of other copolymerizable comonomers. In the case of copolymer UHMWPE, the aforementioned ASTM and ISO requirements should be met. It is their very long polymer chains which make these polymers unique. However, this same feature is also the cause of major processing problems. While ordinary polyethylene can be melt extruded, even polyethylene of very high molecular weight, attempts to melt extrude UHMWPE have been largely unsuccessful, despite much research in this area, and virtually all UHMWPE products are produced by compression molding or ram extrusion. As indicated by U.S. Pat. No. 5,286,576, processing methods applicable to conventional thermoplastics, such as continuous extrusion, calendaring, and injection molding, are generally inapplicable to UHMWPE.

Thus, for example, U.S. Pat. No. 5,422,061 discloses the manufacture of sliding members by screw extrusion of UHMWPE from the melt. However, for the process to work, mixtures of UHMWPE, lower molecular weight polyethylene ("PE"), and lubricants must be employed. Considerable loss in mechanical properties thus results due to the dilution of the UHMWPE with lower molecular weight species. Further losses in properties are caused by shear degradation in the extruder.

U.S. Pat. No. 5,399,308 discloses melt extrusion through a die whose final cross-section is considerably reduced as compared with the diameter of the extruder, and wherein a very low elongational velocity gradient is maintained. However, despite these requirements, only very high molecular weight PE and UHMWPE in the lowest molecular weight range, about $1.5 \times 10^6$, are useful. U.S. Pat. No. 5,449,484 discloses a screw geometry for a single screw extruder said to be useable with PE resins having molecular weights greater than $1 \times 10^6$. However, large profiles cannot be made using such a melt extrusion process.

The problems associated with processing of UHMWPE are due in part to the gel-like nature of the polymer above its crystalline melt temperature, roughly 135° C.-150° C. While ordinary polyethylene is a viscous, molasses-consistency liquid at such temperatures, UHMWPE is a swollen gel which has an extremely high viscosity, and which exerts exceptional frictional stress against the walls of extruders and the like. The problems associated with UHMWPE are described quite clearly by U.S. Pat. Nos. 3,883,631 and 3,887,319. For the reasons discussed therein, ram extrusion and compression molding have thus far been the only processes of producing UHMWPE products which are used extensively.

In compression molding, UHMWPE powder is introduced into a coffin-like mold of very thick section. A thick cover which fits within the mold cavity is then placed on top of the powder, and the whole assembly is heated to above the crystalline melt temperature while being compressed to very high pressure. The molds are then slowly and uniformly cooled, and the product, generally in the form of a thick slab, is demolded. For thin stock, for example of 1 cm to 3 cm thickness, the thick slabs are skived or "planed" to produce thin stock. The skiving process requires an extra process step, and can result in a product that is wavy. As can be seen, compression molding is a cost-intensive and labor intensive method of producing UHMWPE products. However, it is essentially the only process which can be used to make panels or sheets of large width, and is thus still a much used process.

A continuous compression process for the production of thin gauge UHMWPE sheet has been used by Crown Plastics, Harrison, Ohio, U.S.A. In this non-extrusion process a roller belt press previously manufactured by Hoover Ball and Bearing Co. as the Lam-N-Hard laminator, and as described for use in wood lamination by Tarkow, et al., "Surface Densification of Wood," FOREST PRODUCTS JOURNAL, 18(a): 104-107, is used to consolidate UHMWPE powder. However, the process thus far has been limited to thin sheets with a maximum thickness of 3-4 mm and relatively narrow widths. Only recently has a 24 inch wide (0.6 m) sheet been produced by this method, and it is not believed to be possible to produce wider sheets due to the high pressures involved.

Ram extrusion is a unique process which is considerably different from melt extrusion. Ram extrusion may be illustrated with reference to U.S. Pat. Nos. 3,883,631; 3,887,319; and 4,145,175. Despite the fact that the ram extrusion technology disclosed in these references is more than 25 years old, there has been only incremental change in ram extrusion processes since that time.

The overall process may be described in relation to FIG. 1 which shows schematically, in cross-section, a simple ram extrusion machine for production of a UHMWPE rod. The ram extrusion machine consists of very thick section steel member 2 having a through channel 3 into one end of which is received ram 4. UHMWPE powder 5 flows gravitationally into channel 3 from hopper 6. The ram then travels to the left, compressing the powder in the channel, which is now die channel 7. This sequence is repeated continuously. Die channel 7 is heated by heaters 8 which surround the die, and heats the resin particles to a relatively high temperature, for example between 350° F. and 500° F. (177° C. and 260° C.). Temperatures in excess of 500° F. (260° C.) are generally avoided, since the polymer rapidly oxidizes above this temperature. Oxidized polymer exerts yet more friction with the die, and due to the oxidation, products have reduced physical characteristics. The ram exerts a pressure up to several thousand lb/in$^2$, and consolidates the heated, gel-like particles of UHMWPE. The UHMWPE rod 9 exits the die at discrete intervals and at this stage the rod is hot, above the crystalline melt temperature, and relatively translucent. However, at some distance from the die face, the polymer has crystallized to an opaque solid.

Ram extrusion has been used to produce round profiles of relatively large diameter, e.g. 300 mm, and also tubing, small profiles of complex shape, and "boards" having a width of up to about 660 mm, and thicknesses of, e.g. 100 mm. However, such boards are far from flat as produced. If flat boards or thin stock is needed, the boards are skived. Because of the high friction within the die, and consequently the very high pressures involved, the ram, even though made of very high strength steel, may buckle. This is particularly so in parts whose cross-section is quite asymmetric, and even more so in parts having a substantially rectangular cross-section of high aspect ratio. For example, a ram for producing a board of 1 cm×30 cm rectangular cross-section may exhibit buckling, whereas a ram for a thicker board, for example 10 cm×30 cm, will have virtually no problem in this respect at all. Not only can buckling be destructive of the ram, but the distorted ram may scrape the die walls, introducing metal particles into the product and altering die geometry.

It would be highly desirable to employ ram extrusion to produce sheets and panels of large width, for example 1 to 3 meters in width, and of a range of thicknesses, in particular, in standard thicknesses which can be sold as is, without skiving. However, attempts to use the ram extrusion process to prepare such sheets and panels meeting the necessary product standards have been largely futile. The failure of others in the past can be attributed to a number of factors. First, the nature of UHMWPE is such that there is considerable volume contraction upon both cooling and crystallization. Differential cooling or crystallization generates internal stress, as does also differing degrees of polymer orientation. In small profiles or even larger products which are relatively symmetrical, these problems are minimal, or are to a degree self-cancelling. However, in large widths, these problems manifest themselves as thickness variations, bowing, warping, surface fracture, surface irregularities, "walking", edge waviness, etc. The larger the width of the product, the more difficult is the control of such defects.

Moreover, the ram extrusion apparatus itself also has severe shortcomings. The large top and bottom surface areas associated with a slit die, coupled with the large internal pressure, create forces which are very difficult to control. A slit die of 1 cm height and 1 m width, and of 0.5 m length may experience a force of $2.1 \cdot 10^6$ N or more on each half of the die depending upon the internal pressure, which is always high. The restraining bolts in this case will have to bear almost $4.4 \cdot 10^6$ lbs. of force. Even when such a die is constructed of high strength stainless steel of, for example, a 10 cm thickness on each side, the die will deflect so much due to the internal pressure that a board with pronounced greater thickness in the middle as opposed to the edges results. Dies of this size and construction will also rupture, unless supported by massive restraining structures located exterior to the die.

Unlike symmetrical profiles such as rods, tubes, square stock, or small irregular profiles, the large surface area and high aspect ratio of sheets and panels causes them to distort upon cooling below the crystalline melt temperature external to the die. Differences in the rate of cooling and crystallization can cause warping, bowing, thickness and surface irregularities, and the like. Such defects would then require minimally, shaving of the surface and machining to size. However, some defects, for example warp and bow, may be impossible to remove.

For all the above reasons, it has been considered impossible to produce wide sheets and panels of a quality which is commercially acceptable, by ram extrusion.

SUMMARY OF THE INVENTION

The present invention pertains to a process for the ram extrusion of wide, high aspect ratio UHMWPE sheets or panels from a slit die, wherein the uniformity of the sheet is improved by extrusion from a slit die at a temperature less than the crystalline melt temperature, while inducing back pressure by means of a back pressure device, preferably in conjunction with a means for vertically restraining movement of the flat panel product. The back pressure device preferably has a plurality of pressure-adjustable zones distributed across the width and sides of the panel. Pressure adjustable zones are preferably also used on each edge, to minimize side to side movement of the extrusion between the top and bottom back pressure device elements.

BRIEF DESCRIPTION OF THE DRAWINGS

FIG. 4 illustrates a double band press as one embodiment of a vertical restraining device and back pressure device of the subject invention.
FIG. 5 illustrates a pressure adjustable side guide.

DETAILED DESCRIPTION OF THE PREFERRED EMBODIMENT(S)

Figure 1:
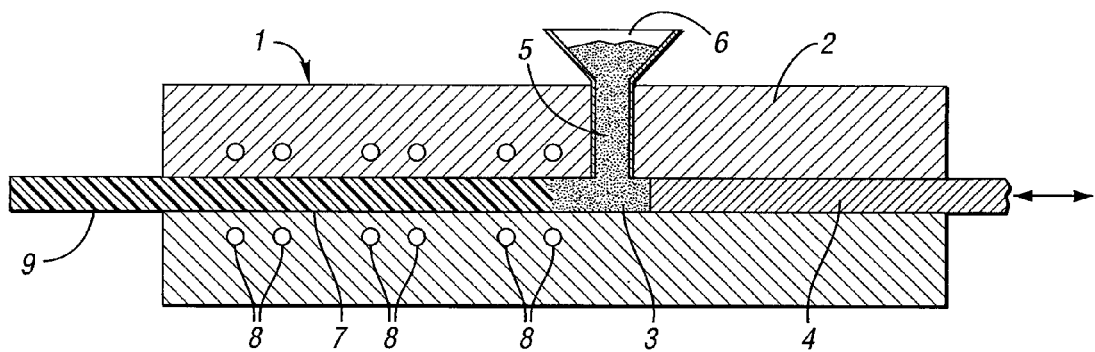
FIG. 1 illustrates a conventional ram extrusion process.

The ram extrusion process employed by the subject invention upstream from the die is substantially that described in U.S. Pat. Nos. 3,887,319, 3,883,631, and 4,145,175, herein incorporated by reference.

The present invention pertains to the ram extrusion of panels of high width and aspect ratio, as described hereinafter. The term "panel" refers to a substantially flat extrusion. Typically, the sharp corners of the nominally rectangular cross-section may be rounded, and indeed, the entire edge portions may be circular, elliptical, etc. A purely rectangular cross-section with sharp corners is generally not desirable due to stress points in the die at such corners. The principle utility of the subject invention is to produce large width sheets of constant thickness, this constant thickness extending to a position at or proximate the edge. Thus, by the definition of "panel" as used herein is meant a generally flat sheet of less than ±0.050 inch (±1.27 mm) thickness variation over a central portion of the panel which includes at least 80% of the overall panel width, preferably at least 90% of the panel width, and most preferably 95% or more of the overall panel width. Thus, it would not depart from the spirit of the invention to produce a sheet having a "dumbbell" or other cross-section, with edge portions significantly thicker or thinner than the majority of the panel. These portions can easily be removed, preferably by the manufacturer but also by the end user, by conventional sawing or slicing steps.

In conventional ram extrusion of thick profiles greater than or about 0.5 inches, the profile generally exits the die at relatively high temperature, above the crystalline melt temperature, as indicated by its transparent or translucent nature. It has been discovered that large sheets and panels cannot be made in this manner, as severe distortion and other irregularities may occur. However, it has also been discovered that even when the panel has cooled to below the crystalline melt temperature while still in the die, i.e. by use of a long die or one with cooling zone(s) near its mouth, irregularities of sufficient magnitude to impair commercial value of the product still occur.

Unlike conventional ram extrusion processes wherein the ram extruded product exits the ram extrusion die at high temperature, generally far in excess of the crystalline melt temperature, in the process of the present invention, the die is cooled proximate the exit such that the UHMWPE panel exists the die at a relatively low temperature, below the crystalline melt temperature, and preferably in the range of ambient to 137° C., more preferably ambient to 79° C. It is believed that under these conditions, the considerable volumetric shrinkage which takes place during crystallization of UHMWPE is controlled, such that the degree of crystallization of the product is more uniform, both in the machine direction and transverse thereto, i.e., across the width of the panel.

By the term "below the crystalline melt temperature" is meant that the surface of the panel is below the crystalline melt temperature of the particular polymer used. Preferably, the panel temperature is below the crystalline melt temperature both at the surface and also to a depth of 3 mm into the panel in the thickness direction. Most preferably, the entire panel is below the crystalline melt temperature. For any particular panel thickness, greater cooling and hence lower temperature throughout the depth of the panel may be achieved by slowing the extrusion speed; decreasing coolant temperature; by elongating the cooling zones in the machine direction; or by any combination thereof.

In order to take advantage of the homogeneity in crystallization and the greater uniformity of product characteristics engendered thereby, it is necessary to maintain contact between the panel and the walls of the die prior to the panel's exit therefrom. The die is relatively massive and possesses a great deal of "thermal inertia," i.e., resistance to changes in temperature. In addition, the die is temperature regulated, both in the heating and cooling zones. By maintaining contact with the die, the thermal inertia is taken advantage of, maintaining a uniform temperature and a uniform rate of temperature change in the UHMWPE panel. The result is substantial uniformity in the degree of crystallization.

However, numerous factors may encourage loss of contact of the panel with the die. One principle cause of this loss of contact is the differential flow rates experienced at the edges of the die as compared to the central portion of the die. Additional fluctuations may be caused by changes in resin powder composition, the temperature of the die proximate the exit, particularly uncontrolled temperatures across the width of the die, temperature excursions due to fluctuations in coolant temperature and/or flow, material shrinkage, etc.

When the panel loses local contact with the die, the rate of crystallization at these localities changes, inducing changes in volumetric shrinkage and also inducing stresses which accompany these changes. As a result, the panel may warp; bow; exhibit edge curl; or may "walk," circumscribing a curved path, rather than a path parallel to the machine direction (a "linear path" as used herein) as it exits from the die. Loss of contact also generates differences in local thickness, to the extent that flatness requirements (±0.050 inch (1.27 mm), preferably ±0.030 inch (0.76 mm), more preferably ±0.020 inch (0.51 mm)) cannot be met. Since these changes often occur during established runs, their correction is needed if a stable process, which has a low scrap rate, is to be provided.

It has now been surprisingly discovered that contact of the panel with the die walls can be markedly improved by imposing an adjustable back pressure onto the panel which has exited the die. The back pressure is adjustable not only in absolute amount, which is generally the least pressure which ensures stable operation, but is also differentially adjustable over the width of the panel, i.e., transverse to the machine direction.

The back pressure is provided by a back pressure device located proximate to the die exit. It should be noted that the back pressure device causes no or substantially no change in the thickness and/or the width of the panel, because the panel is a solid at this point, being below the crystalline melt temperature. Rather, the pressure exerted is a frictional restraint on movement of the panel away from the die, and which translates to the die exit and even into the die interior, e.g., to the heated portions of the die, forcing the UHMWPE to maintain contact with the die walls substantially throughout the length of the die, but most importantly over the cooled section proximate the die exit slit.

The location of the back pressure device is preferably as close to the die exit as is conveniently possible. A distance of 1 cm to 20 cm, preferably 2 cm to 10 cm is preferable, for example. Greater distance may allow for buckling or bowing of the panel due to the back pressure generated, particularly with thin panels of high aspect ratio. Such panel distortion may not be easily recoverable, and thus close spacing between the backpressure device and the die is preferred.

The position of the plurality of back pressure generating elements across the width direction of the panel is desirably symmetrical transverse to a centerline of the panel in the machine direction, but small departures from symmetry can be tolerated. For dies which have been used for extended periods and which exhibit non-uniform wear in the die interior, purposeful deviation from symmetry may be desired. However, assuming a symmetrical and uniform die contour, a symmetrical arrangement of pressure generating elements is preferred. Working in tandem with the back pressure device are optional pressure adjustable side guides that help contain and center the extrusion under the back pressure fixture. These work as a guide to hold in position an extrusion that might otherwise naturally tend to move to the left or right under different back pressure settings across the width of the extruded panel.

The back pressure device may take numerous forms, so long as the device operates to impede the movement of the UHMWPE panel in the machine direction, thus imparting back pressure, and is differentially adjustable across the width of the panel such that portions of the panel may experience greater or lesser back pressure than others. For example, the device may consist of a row of textured or elastomer-coated upper and lower roll pairs distributed across the width of the panel, which press against the panel and are frictionally restrained in rotational movement, this rotational restraint being adjustable between roll pairs. the rotational restraint may be achieved through the use of electromagnetic braking devices, hydraulic devices, etc. The textured surfaces of the rollers, when used, should be such as to avoid leaving an impression on the smooth UHMWPE panel surface. Most preferably, however, the back pressure device consists of one or a plurality of "boards" spaced across the width of the panel, and a plurality of pressure applying means, for example adjustable bolts, adjustable spring devices, or preferably, hydraulic or pneumatic cylinders, all of which may be termed "pressure actuators." While the "boards" may be made of numerous materials, such as fiberglass or carbon fiber composite materials, thermoplastics, metal, etc., it is highly preferred that the board(s) be a wood product, preferably solid wood lumber or plywood, preferably covered with a non-marring woven or non-woven textile material.

Other back pressure devices include any devices which can retard movement of the extruded panel away from the die such that a back pressure is created. Since the UHMWPE panel is extruded below the melt temperature, the panel may be gripped by clamps along the edge, may be restrained by servo-driven continuous belts, etc. For example, a plurality of such belts arranged parallel to each other in the machine direction may be used. Pressure may be supplied as well be inflatable bladders, including metallic bladders or bellows. These may be appropriately coated to provide the desired amount of sliding friction in order that the panel may advance away from the machine while still being restrained.

The vertical pressure on the back pressure elements is preferably supplied by hydraulic or pneumatic cylinders, preferably the latter. For example, 4 inch (100 mm) air cylinders, one or more bearing against each pressure element, and operated at up to 100 psig (6.9 bar gauge), preferably 25 (1.7 bar gauge) to 100 psig, have been found satisfactory during extrusion of a ca. 1 cm thick by 1.2 m wide panel. Greater flexibility in operation can be achieved if each side of the pressure elements, when individual pressure elements are used, are independently subjected to pressure. Thus, for example, each individual upper pressure element, which may be slightly in excess of 1 m in length and 0.4 m in width, may be actuated by right hand and left hand pairs of pneumatic cylinders. For added pressure, these pairs of pneumatic cylinders may be doubled or tripled, for example with one pair at the upstream end of the board and one pair at the downstream end.

Figure 2:
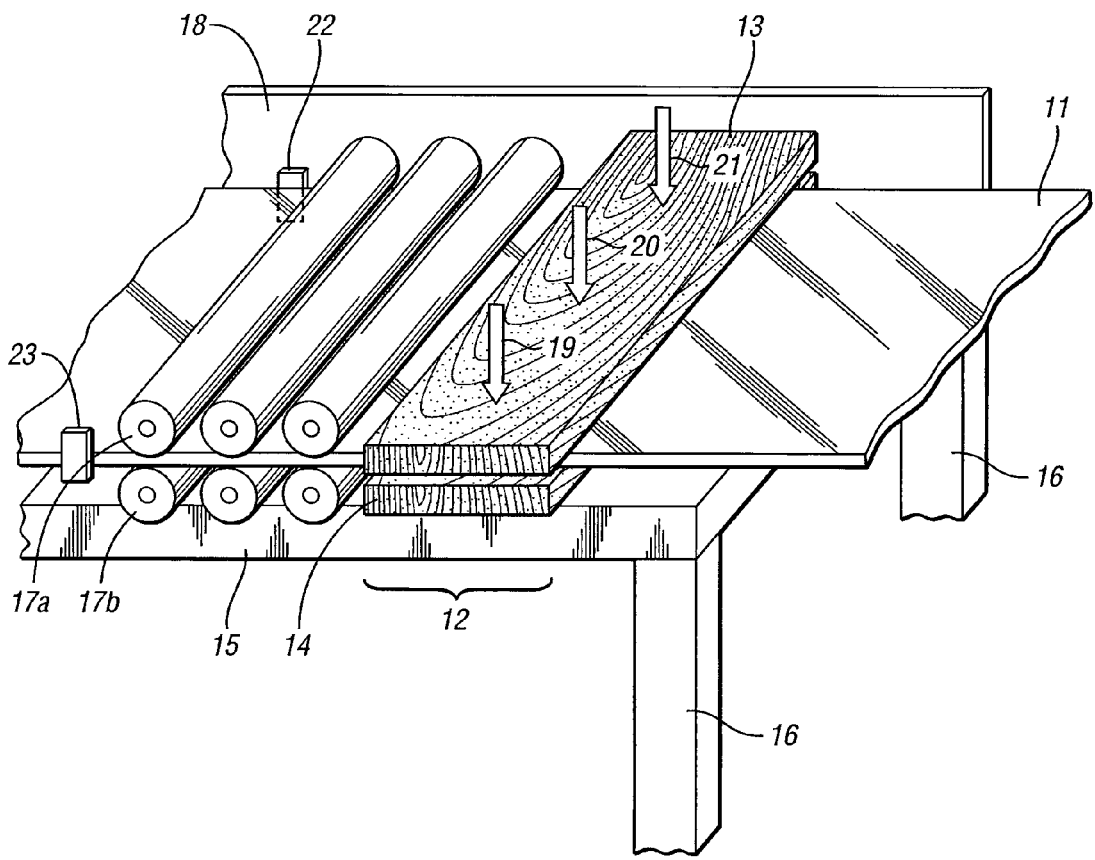
FIG. 2 illustrates an embodiment of a back pressure device of the subject invention.

One example of a back pressure device is shown in FIG. 2 in perspective. The die is not shown for clarity. The UHMWPE sheet 11 has exited the die (not shown, to the right) at a temperature below the crystalline melt temperature. The back pressure device 12 consists of two platens in the form of sheets 13, 14 of wood or plywood, the upper platen 13 for example, of 0.5 inch (12.5 mm) thickness. The lower plywood sheet, which is preferably of 1.0 inch (2.5 cm) thickness or of greater thickness, is maintained in position by fastening to a support structure 15 supported by legs 16. The support structure may be any convenient structure having the necessary rigidity, for example, a structure made of aluminum or steel channel, etc. Following the back pressure device in a preferred embodiment, are a series of freely rotating roll pairs 17a, 17b which may be made of any suitable material, for example, mild steel, stainless steel, or aluminum, and which are suitably positioned above and below the UHMWPE panel, for example, by a pair of side rails. One side rail 18 is shown, the front rail being deleted for purposes of clarity. The ends of the rolls may have pins located in sockets in the support rails, may be constrained within ball bearing races, etc. The roll pairs may be located such that they lightly bear against the panel; may, particularly if solid, rest on the UHMWPE panel, or may be adjusted in position to just contact or to avoid contact by a narrow space, for example, but not by way of limitation, 0.010 inch (0.25 mm) or 0.005 inch (1.25 mm). The purpose of the roll pairs is to assist in maintaining panel flatness as the panel cools further, not to alter back pressure, although if they bear against the panel and are restrained in movement, they may assist in this function as well. The rolls are advantageously 1.0 inch to 4.0 inches (2.5 to 10.2 cm) in diameter, more preferably 1.5 inch to 4 inches (3.8 to 10.2 cm) in diameter, and are preferably relatively closely spaced in the machine direction; e.g., at a spacing of 0.10 to 3.0 inches (2.5 mm to 7.5 cm) (circumference to circumference), preferably 0.2 (5 mm) to 2.5 inch (6.4 cm) apart. As indicated previously, the roll pairs are optional, and can in fact be used with back pressure devices other than those having a plurality of pressure elements, and can be used alone as well.

Arrows 19, 20, and 21 illustrate points at which pressure is applied to the back pressure device, preferably by hydraulic or pneumatic cylinders positioned above the back pressure platen 13. While three points of pressure are shown, two pressure points, for example 19 and 21 may be used, or a higher plurality, i.e., four, five or six, generally less than ten, pressure points may be used. Pressure may also be applied from the bottom, i.e., to bottom platen 14, or to both platens 13 and 14.

The UHMWPEs employed in the process are conventional powdery resins, as supplied by Ticona, Braskem, and DSM, for example. Preferred number average molecular weight ranges are between $2 \cdot 10^6$ Da and $10 \cdot 10^6$ Da, more preferably between $4 \cdot 10^6$ Da and $8 \cdot 10^6$ Da. Although the preferred UHMWPE used in the present invention is homopolymeric or substantially homopolymeric, i.e. with only a low content of copolymerizable comonomers, the compositions may, as also indicated elsewhere herein, include conventional processing aids or property-modifying additives. Examples of the latter groups of components include, but are not limited to, components such as thermal stabilizers; UV stabilizers; nucleating and clarifying agents; dyes and pigments; electrically conducting materials such as metal powders, carbon powders, graphite and the like; fillers, for example non-reinforcing fillers having BET surface areas $<50$ m$^2$/g and reinforcing fillers such as fumed silica having surface areas $\geq 50$ m$^2$/g; lamellar reinforcements such as mica, expanded shale, and the like; fibrous reinforcement in the form of chopped or otherwise attenuated fibers, for example glass fibers, ceramic fibers, aramid fibers, metal fibers, carbon fibers, thermoset and thermoplastic fibers such as those of polyimide, polyetherimide, polysulfone, polyethersulfone, polyether ketone (PEK) and its variants (PEKK, PEEK, etc.); tougheners such as particulate elastomers; other thermoplastics, such as non-UHMW PE; plasticizers, etc. The amounts of such additives is generally small.

UHMWPE when heated above 180° F. (82° C.) begins to lose strength, and become less rigid. Due to the extreme width to thickness ratio of wide panels of the material, when exiting the die above 200° F. (93° C.) the material will move at different rates along the width. This causes tearing, and humping. Several factors contribute to these observations, including die cleanliness at start up and which remains in a state of flux, pinch point condition, die plate flex, die plate condition, and hang up. Multiple post extrusion pressure zones allow different sections of the sheet product to be adjusted according to the observed condition. Areas wanting to hump may have additional pressure applied to them, while areas that tear will have their pressure reduced.

Bow, both horizontal and vertical, is caused due to stress and uneven heating and or cooling of the material. Post extrusion pressure zones may be used to counter uneven slip and drag in the tool that cause stress. The multiple zone configuration allows adjustments to be made in localized areas of the sheet, depending on the direction and type of bow. Basically, the pressure zones are used to even the flow of material, across the width, as it exits the tool.

The post die pressure fixturing also provides additional control of the internal pressure of the die, thereby increasing or decreasing the final opening size of the cavity. It is normally only used to increase pressure if required during a production run. It is effective, but is not reliably repeatable. Pressure is generally used only for large adjustments.

In operation, the operator observes the flatness or other product characteristic of the panel as it travels between the roll pairs, or after exiting the roll pairs, for example prior to or after cutting to length. In one embodiment, side position sensors 22, 23 may be installed to detect sidewards motion. If the sheet begins to exert pressure on sensor 22, for example, this is a sign that the opposing side may be moving through the tool and exiting at a higher output rate, or may have inadequate contact with the die and is cooling too slowly and shrinking differentially. Accordingly, greater pressure would be exerted on pressure point 19, or lesser pressure on pressure points 20, 21. Likewise, thickness measurements indicating a thinner panel on the left side (left when facing the die exit) imply slower cooling, greater crystallinity, and correspondingly greater shrinkage has occurred as compared to other points. This may indicate inadequate contact of the right side of the panel with the die, allowing slower crystallization due to loss of contact with the cool die proximate the exit. Increasing back pressure on the right side by applying greater pressure at pressure point 19 is warranted. In summary, the vertical pressures on various zones of the back pressure device transverse to the machine direction are adjusted to maximize flatness and dimensional stability. This cannot ordinarily be accomplished by a single back pressure zone; a plurality of zones is required, although once stable operation is attained, it is not unusual that little, if any further change, be made to the back pressure device, even for long runs. However, the pressure settings may vary from run to run, and will vary most between start up and stable operation. The same device can be used to run materials other than UHMWPE, as well as UHMWPE with differing additive packages, and may be adjusted accordingly depending on the pressure requirements for each particular material.

In addition to providing differentially adjustable back pressure across the width of an extruded panel, the back pressure devices of the subject invention can also be uniformly actuated or subject to the same increase or decrease in pressure across the width when the pressure in the die is in need of adjustment. In a slit die of large width, under ram extrusion conditions, large internal pressure are generated. The geometry of the die takes into account the deflection which will occur at the expected operating pressure such that a flat panel is the extruded product. If the pressure in the die is reduced, for example by a change in internal temperature or batch-to-batch resin variation, the height of the die, particularly at its mid-section, will decrease. The result will be a panel which is thinner in the middle than at the edges. Likewise, an increase in pressure will cause the die to distort more than planned, and the panel product will now be thicker at the middle than at the edges. Increasing the pressure on the back pressure fixture elements will increase the internal pressure in the die and vice versa, and thus monitoring the relative thickness of the central area of the panel with the edge thickness will alert the operator or control device as to when a global increase or decrease in back pressure is mandated to keep product within specification and preferably to optimum thickness variation. Thus, by varying the back pressure on the panel exiting the die, the die geometry is altered by a corresponding change in internal pressure.

Wood back pressure devices, such as those of FIG. 2 (13, 14), are generally coated with soft fabric, woven or nonwoven, to minimize scratching of the UHMWPE panel surface. The panels may also be faced with soft plastic, but this is less desirable, as such facings may acquire grit embedded into the surface, causing scratching. While fabrics and felts may also suffer from this problem, they are easily and inexpensively changed.

A potential disadvantage of the back pressure device of FIG. 2 is that the back pressure across the back pressure device is not truly independent, since the pressure exerted, for example, at pressure point 20 will also be exerted in part at points 19 and 21. The more rigid the sheets 13 and 14, the less independent the pressure adjustment, and thus in this embodiment, the sheets which make up the back pressure device are preferably relatively thin, or are scored to be flexible across their width, i.e., flexible transverse to the machine direction, by scoring parallel to the machine direction, through the use of linking devices or hinges, etc.

Figure 3A:
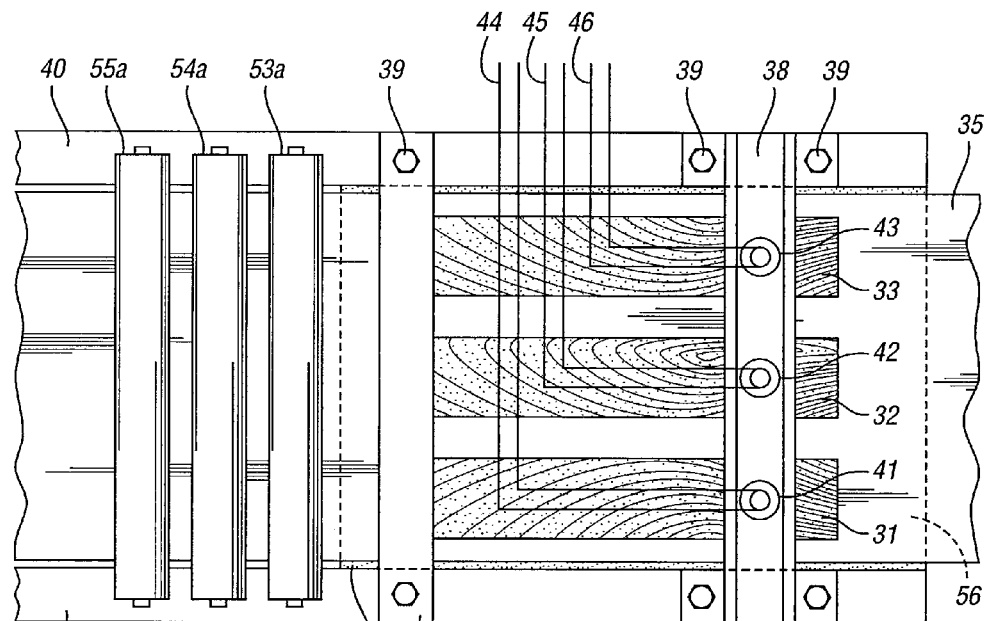
FIGS. 3a, 3b, and 3c illustrate further embodiments of a back pressure device of the subject invention.
Figure 3B:
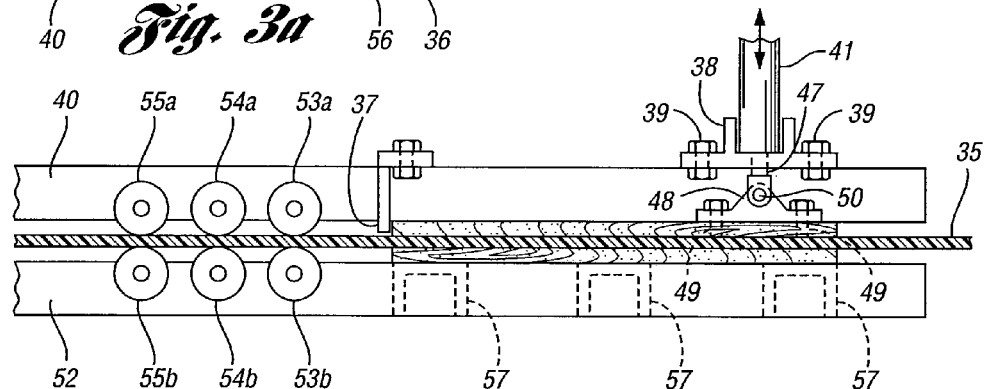

A preferred embodiment of a back pressure device is illustrated by FIG. 3. In FIG. 3, the back pressure device is formed of three upper pressure platens 31, 32, 33 of 0.75 inch (19 mm) thick wood or plywood. The back edges in the machine direction are prevented from drifting downstream with the ram extruded UHMWPE panel 35 by end restraint 36 which has a downwardly extending lip 37. Located above the upper pressure platens proximate their upstream ends is pressure actuator support 38. Both the end restraint 36 and pressure actuator support 38 are fastened to C-channel rails 40 by fasteners 39. Positioned above each upper pressure platen (31, 32, 33) is a pressure actuator, here, respective pneumatic cylinders 41, 42, 43 which are fed pressured gas by supply lines 44, 45, 46. The shaft, or plungers of the pneumatic cylinders are attached to the pressure platens by any convenient method. As shown in FIG. 3B, a side view of the back pressure device and associated equipment, shaft 47 is attached to platen 31 by means of bracket 48 and pin 50. Bracket 48 is attached to platen 31 by screw fasteners 49. Devices such as bladders, independently driven wheels, flexible plates deflected by servo, stepping devices or thermal expansion devices may be used in place of pressure cylinders to actuate the back pressure device. Substantially any device which allows for variation of pressure applied to the back pressure elements is suitable.

Mounted below the passageway for the UHMWPE panel on lower frame rails 52 is the single (in this embodiment) lower platen 56 which is firmly attached to frame rails 40 and 52, and supported by crossmembers 57 to provide rigidity. The UHMWPE panel 35 passes between upper pressure platens 31, 32, 33 and lower platen 56. The upper platens, lower platen, and pressure actuators, with their necessary supports and locating devices, etc., form the back pressure device.

Following the back pressure device are vertically restraining roll pairs 53a,b, 54a,b, 55a,b, as shown in FIG. 3A, 3B. These roll pairs are journaled into the upper and lower frame rails 40 and 52, and are sized and positioned so as to just contact the UHMWPE panel 35. While three roll pairs are illustrated, it is desirable to have twenty or more roll pairs. The roll pairs serve a dual function of removing heat in a relatively uniform manner while also maintaining flatness of the panel. In this manner, the roll pairs, while preferably employed together with back pressure devices having independently adjustable pressured zones, can also be used together with a back pressure device having but a single pressure zone, although this is not preferred. Between channels 40, 52 are spacer strips or blocks to sandwich the wood lower platen between the rails. Alternatively, the lower platens may be fastened to crossmembers 57 or otherwise supported, e.g. by a welded-in frame, etc. The apparatus illustrated in FIGS. 3A, 3B, and 3C can be constructed in numerous ways and out of numerous materials, by one skilled in the machine and fixture construction arts.

Figure 3C:
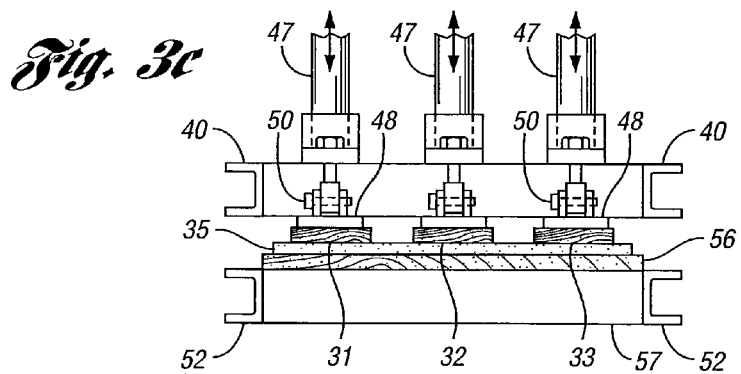

A similar embodiment to FIGS. 3A, 3B, and 3C, which is less preferred, employs multiple lower "platens" below the extruded panel, thus taking the place of single platen 56. The platens are preferably made of wood material in all the embodiments due to its low cost and excellent thermal properties. Wood products which exhibit minimal distortion are preferable, for example layered wood products such as plywood. Solid wood products are desirably stable species such as mahogany. Layered wood products having reinforcing layers or facings such as resin matrix woven or non-woven fiberglass or carbon fiber are also useful. If made of thermally conductive materials, it is desirable that the platens have either a high thermal mass (inertia) or contain insulative layers, or both, to minimize temperature fluctuations and maximize heat retention.

For the extrusion of a single panel, the amount of downwards pressure exerted against the panel, which retards movement of the panel ("restraining force or friction") and thus gives rise to back pressure, depends upon the thickness of the panel being extruded and its width. The pressure preferably should not cause the panel to bow or bend between the exit die and the back pressure device, and thus for panels of a fixed width, the thinner the panel, the less back pressure can be tolerated, and the pressure applied to the extruded panel in a vertical direction, i.e., the "restraining pressure," is less than for a thicker panel of the same width. These considerations, together with the desirability of maintaining contact of the panel with the walls of the die at least in the cooling zone, limit the minimal thickness of the extruded sheet to approximately 3-4 mm in thickness, and preferably 5-6 mm, assuming a width of 0.4 to 0.5 m.

The minimum width of the panels is about 0.4 m, more preferably 0.5 m, and yet more preferably at least 0.6 m, with widths of 1.0 m to 1.3 m preferred. The maximum width is limited only by the ability to manufacture a suitable die, and for practical reasons is generally less than 3 m, and more preferably about 1.5 m (5 ft) or less.

The aspect ratio of the panels is also important. The minimum aspect ratio (width divided by thickness) for panels above 0.6 m in width is preferably about 20, more preferably above 40, yet more preferably above 60, and desirably above 80, for example 100-250. As one example, a 1.2 m wide panel with a thickness of 1 cm will have an aspect ratio of 120. At lower aspect ratios than 20, it may be difficult to apply sufficient back pressure by the means described heretofore, without affecting the surface finish of the panel. For smaller panels, i.e. in the range of 0.4 to 0.6 m in width, an aspect ratio greater than 10 is preferable, more preferably greater than 20, yet more preferably greater than 40, and still more preferably greater than 60. Aspect ratios greater than 100 are particularly preferred.

Thus, in one embodiment, the invention is directed to a back pressure device having differential pressure zones for use with ram extruded UHMWPE. The invention is also directed to the use of a plurality of vertically confining roll pairs or other vertical restraints downstream from a back pressure device, even one without a plurality of differential pressure zones, which confine the panel dimensionally until the temperature of the panel is in the range of ambient to 85° C., more preferably ambient to 43° C. and yet more preferably, to a temperature within the range of 32 to 37° C.

It should be noted that the back pressure generating elements which are differentially adjustable may individually be set at zero or substantially zero pressure. Thus, some back pressure elements may only lightly contact the panel, while others may exert considerable pressure. It should also be noted that the difference in pressure is not required to be totally independent, as also explained elsewhere. All that is required is that a difference in pressure between at least two and preferably all back pressure generating elements may be established.

The side guide devices are located on both sides of the panel exiting the die, preferably in the neighborhood of the back pressure fixture. The side guides may constitute a pin or bar positioned vertically, whose sides bear against the panel. However, to avoid any impression on the edges of the panel by the side guides, the latter are preferably in the form of a horizontal bar or channel, preferably one of wood, cloth covered wood, or lubricious plastic, for example a UHMWPE or nylon—faced metal channel.

Reference may be had to FIGS. 5A and 5B which illustrate side guides. For simplicity, the framework and other details have been omitted.

The back pressure fixture of FIGS. 5A and 5B consist of a lower board or platen 51 and three upper platens 52, 53, 54. Pressure is applied through means of the platens to UHMWPE panel 55 by pneumatic cylinders 56, 57, and 58 which bear, respectively, against platens 52, 53 and 54. There are 12 pneumatic cylinders in all, two on the left side of each platen, as shown in FIG. 5A as 56a, 56b, and two on the right side. The cylinder rods are attached to the platens by brackets 59 and clevis pins 60.

The side guide devices 61 consist, as illustrated in FIG. 5B, of a lubricious thermoplastic bearing surface 62 which is bonded or otherwise attached to metal channel 63. Pneumatic cylinder 64 applies pressure through cylinder rod 65 which is secured to metal channel 63 by bracket 66 and clevis pin 67. Other fastening means are also suitable, and other pressure arrangements. Two such devices are shown in FIG. 5B, one on each side of the panel 55.

The side guides are shown in FIG. 5A from the side. In this case, two side guides are used on each side of the panel, in order that greater sideways pressure can be applied.

The present invention is also directed to a process of ram extrusion of UHMWPE panels having a width in excess of 0.4 m, more preferably >0.6 m, and yet more preferably in the range of 1.0 to about 1.5 m, which process comprises the steps of:

ram extruding an UHMWPE panel through a slit die wherein the temperature of the panel exiting the die is below the crystalline melt temperature;

restraining movement of the panel away from the die such that a back pressure is created;

optionally, guiding the panel's horizontal movement transverse to the machine direction;

monitoring at least one characteristic of the panel which has a defined product specification value;

determining when the at least one characteristic is outside the product specification value or is exhibiting a change in the characteristic away from a desired value of said characteristic; and adjusting the back pressure differential along the width of the panel to bring the at least one characteristic within the product specification or to counteract the change in the characteristic away from a desired value of the characteristic.

The restraining of movement of the panel away from the die is most preferably a frictional restraint. This frictional restraint may be a sliding friction where there is relative movement between the UHMWPE panel and the surface of the back pressure devices, for example, those illustrated by FIGS. 2 and 3, or may be a restraint which does not allow for sliding friction. Examples of the latter are elastomer coated rollers which rotate in a restrained manner, but grip the panel surface in a non-sliding manner, or a double band press as described below.

An embodiment with a double band press is illustrated in FIG. 4. Traditionally, double band presses are employed to consolidate materials such as thermoplastic matrix, fiber-reinforced semi-finished products by applying a consolidating pressure, and often heat as well. In the present invention, a rather simple form of double band press may be used as a vertical restraining means following a back pressure device, or as illustrated by FIG. 4, may also serve as the back pressure device itself. In the former case, the bands or belts of the "press" bear against the UHMWPE panel, and are not necessarily driven, the frictional contact with the sheet providing the driving force for the bands and the rolls supporting them. In the latter case, the bands are driven synchronously but delayed with respect to movement of the ram of the ram extruder such that a back pressure is created between the double band press and the die.

In FIG. 4, the double band press 70 is constructed with two continuous bands or belts 71, 72 which bear against UHMWPE panel 73 extruded from ram extrusion die 74 (also refer to FIG. 1). Located above the lower portion of the top band are platens 75, 76, 77, 78, and located below the upper portion of the lower band are platens 79, 80, 81, 82. These platens may be adjusted to bear the bands against the panel from an essentially pressureless contact to a relatively high pressure. Due to the incompressibility and relatively high strength of the panel, a quite low pressure, due to the large surface area of the bands, will prevent movement of the panel except when such movement is desired.

The platens may also be heated or cooled. Since the travel of the panel is relatively slow, the panel can spend a considerable time within the press. Thus, for example, the beginning of the press can be heated to the crystalline melt temperature and maintained at this temperature or slightly above or below to anneal the panel or promote additional crystallization of the UHMWPE. Care must be taken to ensure temperature uniformity in such cases.

The press in this embodiment is driven by electrical motors or other means (not shown) in an incremental fashion synchronously but delayed from the travel of the extrusion ram 84. Thus, as the panel attempts to exit the die, it will experience a considerable initial pressure between the press and the die since the press at this point is stationary. If the press remained stationary, the panel would greatly distort. However, the driving means is tied to the movement of the ram by feedback loop 85, and the driving motors on/off cycle and speed during their on condition are regulated by a conventional process controller or PLA 86. The start of movement of the bands may be delayed by from 0.01 to 0.10 second, for example. The normal delay in beginning rotation of the press may provide this delay.

The UHMWPE panels produced by the subject process are, in general, superior to products of similar dimensions which are produced by compression molding of large, thick blocks followed by skiving. Noteworthy among the superior characteristics are a more uniform thickness, freedom from edge curl and end curl, and a smooth glossy finish. The surface normally is characterized by parallel shot marks which are difficult to observe except at oblique angles. Each product which is commercially acceptable must meet product specifications, which may constitute a minimum value of a particular characteristic, a maximum value, or a range of values. For example, a nominally 1.0 m wide sheet may have a width tolerance of ±0.5 mm; or −0 mm, +0.5 mm, etc., Likewise, thickness variations may be expressed by ranges such as ±0.050 inch, ±0.020 inch, −0, +0.30 inch. etc. Edge curl may be set to a distance from the edge towards the center of the width of the sheet where edge curl is absent, i.e., up to 1 cm, up to 2 cm, etc. Similarly, warp, bow, and end curl may have values set for them.

The foregoing product specification values are generally set by the manufacturer, the distributor, or the end user. Regardless of who determines what product characteristics are necessary, the manufacturer must adjust the process in order to meet these specifications. All these product characteristics are easily measured by methods well known in the art. Edge straightness, for example, can be measured by abutting the edge of a sheet against a reference flat surface and noting departures from contact. Thickness may be measured by feel gauges, by profilometry, optical interferometry, etc. Many of these measurements can be made following the cutting of extruded panels to size, employing a statistical sampling regime. Other measurements can be made on line on the moving panel, especially thickness variations, and any tendency for the panels to "walk." Some characteristics, such as warp, bow, and walking will be evident to the machine operator, who will then make the necessary adjustments in back pressure to restore the characteristic to its desired value. For example, a panel which is tending to walk towards the left can, following adjustment, be made to exit the die and continue downstream in a linear fashion by suitable adjustment of back pressure on a portion of the panel relative to other portions. A panel which has not "walked" and thus whose sides are at right angles to its length, is said to be "orthogonal", and the measurement of "walking" may be described in terms of "panel orthogonality". The edge of a panel which has walked and is thus not orthogonal will exhibit a curved edge when compared to a straight reference surface. In very unstable processes, S-shaped curves where walking fluctuates between left and right directions may also occur. The side guides described herein may also assist in preventing "walking".

In like manner, if the thickness specification is ±0.020 inch (0.51 mm), the panels have not exceeded ±0.010 inch (0.25 mm), but suddenly or gradually tend towards greater variations in thickness, for example one side or a central portion increasing in thickness such that continued increase over time will exceed the ±0.020 inch (0.51 mm) thickness specification, then the back pressure device is adjusted over a portion of the width of the panel to discontinue this trend, or to reverse it.

The ram extrusion of UHMWPE panels of large width and high aspect ratio has been found by the present inventors to be a delicate process; so much so that a change from one batch to another of UHMWPE resin powder can cause unexpected process changes, as can also such factors as die wear and changes in die surface roughness, and even such common events as the cycling of the building HVAC (heating, ventilation, air conditioning) system, or the opening or closing of a door to the operating environment. While extreme excursions in various operating parameters may be beyond the ability of the differential back pressure device to compensate, it has been found that many of the changes which affect product characteristics are due to partial or total loss of contact between portions of the panel and the die, and can be compensated for by the differential back pressure device of the present invention.

It is an object of the present invention, therefore, to employ a back pressure device, preferably a back pressure device with a plurality of adjustable back pressure zones, and a vertical restraining means, alone or in combination, to provide a stable process. By a stable process is meant a process where long runs of product, runs lasting, for example for minimally 8 hours (1 operating shift), to several days, or to weeks or even months, without producing significant amounts of off-spec products. In a typical 3-7 day run, for example, a scrap rate of less than 10%, preferably less than 5% would be expected. The stability of the process is achieved either automatically under suitable process control, or by an operator. It has been found that operator training is rapidly accomplished.

Example

A panel of UHMWPE of a nominal ⅜ inch (9.525 mm) thickness and a width of about 1.2 m is ram extruded from a die having a heated zone maintained at about 420° F. (215° C.) followed, in the machine direction, by a plurality of cooling zones, such that a flat sheet having a thickness tolerance of ±0.030 inch can be produced during stable operation. The sheet exits the die at a temperature of about 150° F. (65.6° C.), below the crystalline melt temperature.

The start-up temperatures are at a target temperature of 345° F. (174° C.). The hopper is filled with UHMWPE resin powder having a number average molecular weight of about $4\times10^6$ Da, and purged with nitrogen. The ram, having a thrust of 2 inches (5 cm) is cycled at the required interval. As the material exits the die, it begins to warp and deform. Concurrently, it also bows hard to the left. To counter this distortion, a back pressure fixture is applied to the panel to regain and maintain control.

The fixture consists of a bottom, cloth covered, rigid, flat surface back pressure fixture of plywood, positioned below the panel. Below the bottom back pressure fixture is a table supported from the floor. The table height is adjusted such that the top surface of the bottom brake fixture is close to the same level as the bottom of the slit die opening. Three fixtures are constructed of rigid plywood covered with cloth, and placed on the top of the panel. The fixtures each measure 42" (1.07 m) in length and 16¾" (42.5 cm) wide, and cover the first 42" (1.07 m) of panel across substantially the entire width. The top three fixtures are then pressed down against the panel with four pneumatic cylinders each, two cylinders on the left side of each fixture, and two on the right, with the two on each side tied together and actuated utilizing the same valving and regulator system. This combination gives the ability to adjust each top brake fixture on both its left and right sides, thereby creating six zones of pressure control across the width of the part. The air cylinders are three inches in diameter, and can be regulated from 0 PSIG to 100 PSIG (0 bar to 6.9 bar gauge). The cylinders are evenly spaced an approximately 26" (66 cm) apart in the machine direction. On each side of the panel is a side guide device to keep the panel from moving out from underneath the back pressure fixturing. These are actuated and controlled by similar valving, regulators, and cylinders as the top fixture, and are also made of plywood.

The top fixtures are placed on the panel, and the regulators set at 10 PSIG (0.69 bar gauge) to stop the warping. Once the fixture is pressurized, the sheet begins to flatten, but still bows to the left. Most of the warped areas are trimmed off, and the side of the panel is trimmed back so the edges of the panel are inside the side guide area. The side guides are then actuated at 20 PSIG (1.38 bar gauge), effectively encapsulating the panel. As the panel moves forward out of the brake fixture, it is guided between rollers guides for further control. The top rollers are initially raised 8"-10" (20 cm-25 cm) above the bottom rollers to allow any sheet with warpage to easily pass through. Once completely through the roller guides, the top rollers are lowered down onto the sheet. The roller guides are provided over a length of 20' (6 m) and are furnished in pairs, one roller above and one below the panel. The rollers are 3" (7.5 cm) in diameter, and spaced approximately 5" (1.25 cm) apart, center to center.

Once reasonably stabilized, the sheet is observed to have warping/raised areas on the right side of the sheet. The back pressure zones are then adjusted by raising the air pressure to the pneumatic cylinders to 40, 40, 45, 50, 60, and 75 PSIG from left to right (2.8, 2.8, 3.1, 3.4, 4.1, 5.2 bar gauge). This decreases, but does not completely stop the warping, so the back pressure fixture is re-adjusted to 40, 40, 45, 50, 75, 85 PSIG (2.8, 2.8, 3.1, 3.4, 5.2, 5.9 bar). At these settings, the sheet is no longer warped, but has a slight bow to the left. The back pressure is again adjusted to 40, 40, 50, 75, 80, 95 PSIG (1.8, 2.8, 3.4, 5.2, 5.5, 6.6 bar). The sheet straightness now falls within the required tolerance range, and no more adjustments are needed. Between each adjustment, 30' (9.1 m) of material is produced. This is due to the fact that the fixturing devices are 25' (7.6 m) long, and as the sheet produced under the new adjustments should extrude past the end of the fixture to assess its over all quality.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for maintaining the flatness of an UHMWPE panel of aspect ratio greater than 20 and a width greater than 0.4 m, comprising:
    a) ram extruding UHMWPE through a slit die to provide a UHMWPE panel, the temperature of the panel exiting the slit die being below the crystalline melt temperature of the UHMWPE employed;
    b) restraining movement of the UHMWPE panel away from the die to create a back pressure between the die and a back pressure device; and
    c) restraining vertical movement of the panel by vertical restraints positioned above and below the panel, until the temperature of the panel has been reduced to a temperature lower than 43° C.

2. The process of claim 1, wherein said vertical restraints restrain vertical movement of the panel in a substantially frictionless manner.

3. The process of claim 1, wherein said vertical restraints comprise a plurality of roll pairs, the UHMWPE panel being restrained between said roll pairs.

4. The process of claim 1, wherein said vertical restraints comprise a double band press whose bands travel intermittently at substantially the same speed as the extruded panel.

5. The process of claim 4, wherein a first portion of said double band press is heated to a temperature sufficient to anneal the UHMWPE panel.

* * * * *